United States Patent Office 2,896,138
Patented July 21, 1959

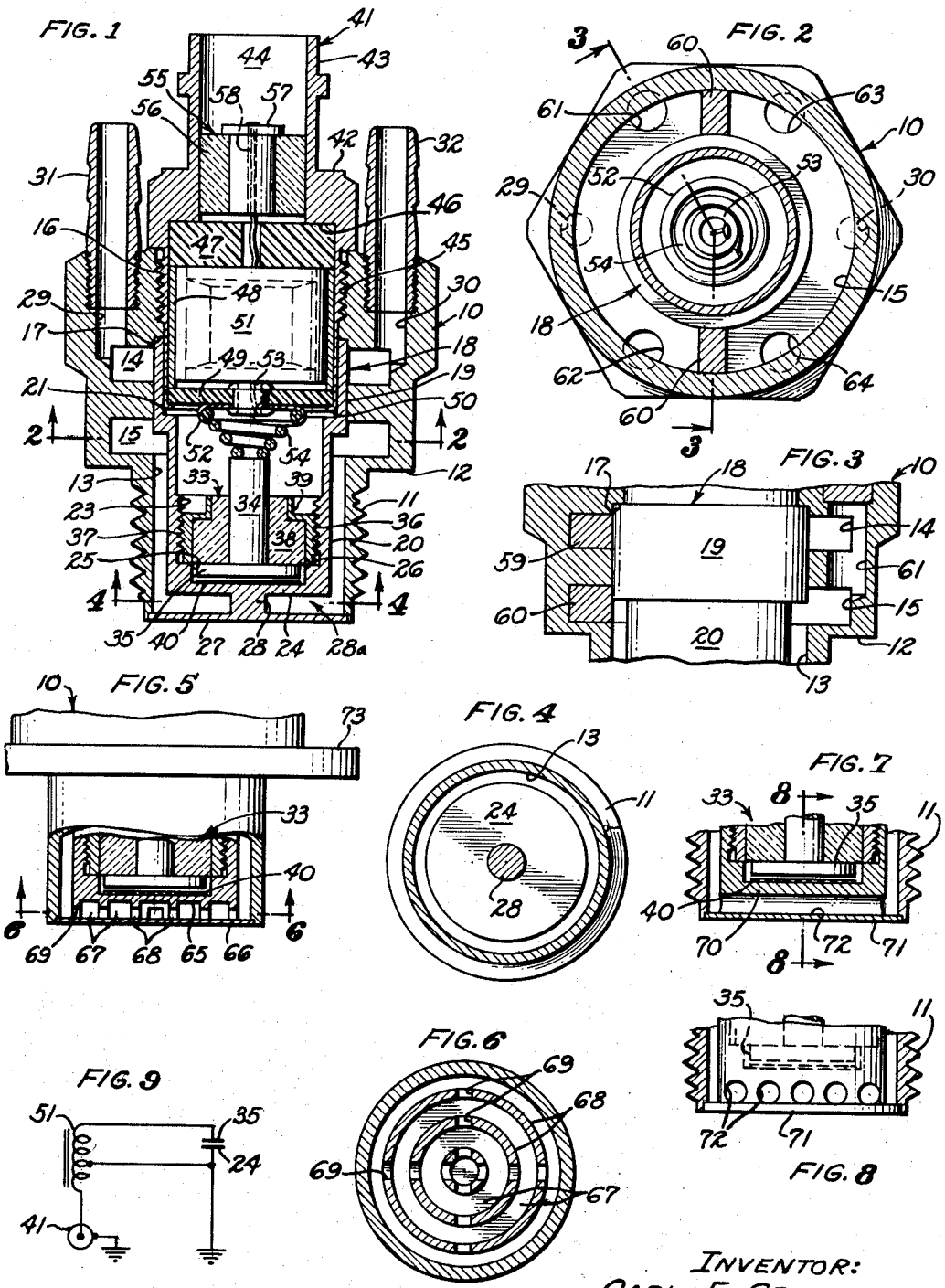

2,896,138

PRESSURE INDICATOR

Carl E. Grinstead, Altadena, Calif., assignor to Photocon Research Products, Pasadena, Calif., a corporation of California Application August 30, 1955, Serial No. 531,485

10 Claims. (Cl. 317—246)

This invention relates to pressure indicators of the class commonly known as "transducers" or "pickups," in which a mechanical movement in the indicator changes the electrical response of a variable circuit element of an electrical measuring circuit.

An object of the invention is to provide an indicator for measuring pressures which will alter the electrical response of the circuit element in a more nearly direct proportion to pressure change than has hitherto been attainable in devices of this class.

When measuring pressure with pickups, it is desirable to secure a linear response such that a change of a given amount in circuit conditions bears a direct linear relationship to the change in pressure being measured. By this means, data can be obtained which is directly useable without calibration of the measuring system to determine its non-linear properties, and which data can therefore be used without corrections for non-linearity.

Presently-known pressure pickups suffer from a sensitivity to the conditions in their surrounding media, particularly with respect to the structure in which the pickup is mounted. For example, shock waves transmitted through an engine block have been found to create changes in the condition of the variable circuit element of greater magnitude than the changes occasioned by the pressure being measured. Therefore, when using conventional pickups, it sometimes occurs that the shock waves mask out the measured phenomena, and render the resulting data meaningless.

It has been found that one significant cause of nonlinearity in presently-known pressure pickups resides in the deformation of the outer body of the pickup where it is attached to the body in which pressures are measured. One such cause may be termed a "thread-stretch" effect. This may result when the device is screwed too tightly in a port, or when a strain is imposed on the body due to a difference in the thermal coefficients of expansion of the pressure indicator and of the structure in which it is mounted.

Still another significant cause of non-linearity has been found to reside in the use of heavy diaphragms for joining the outer body of the pressure indicator and the variable circuit element. As the connection between the variable circuit element and the outer body is made more rigid, then more and more of the undesirable forces exerted on the body, such as shock waves, will be transmitted to the circuit element, and thereby render the pressure indicator less accurate.

This invention is carried out by providing an outer body which is adapted to be attached to a structure such as the wall of a combustion chamber. This body is provided with a bore, within which a variable circuit element is disposed. This element is preferably, although not necessarily, a condenser. The circuit element is mounted to the outer body, but its periphery is spaced from direct contact with said outer body, thus isolating it from many undesirable stresses which might be transmitted to it from the outer body.

According to a preferred but optional feature of this invention, a moveable part of the variable circuit element is connected to the outer body via a diaphragm.

Still another preferred but optional feature of the invention resides in providing a first diaphragm as one part of the variable circuit element, and providing a second diaphragm, which is thinner than the first diaphragm, for interconnecting the first diaphragm to the outer body. The second diaphragm is attached to the outer body, and a post joins the two diaphragms.

The above and other features of this invention will be fully understood from the following detailed description and the accompanying draawings, of which:

Fig. 1 is a side elevation, partly in cross-section, of a pressure indicator according to this invention;

Fig. 2 is a cross-section taken at line 2—2 of Fig. 1;

Fig. 3 is a fragmentary cross-section taken at line 3—3 of Fig. 2;

Fig. 4 is a cross-section taken at line 4—4 of Fig. 1.

Fig. 5 is a fragmentary side elevation, partly in cross-section, showing another form of the invention;

Fig. 6 is a cross-section taken at line 6—6 of Fig. 5;

Fig. 7 is a fragmentary side elevation, partly in cross-section, showing still another form of the invention;

Fig. 8 is a view, partly in cross-section taken at line 8—8 of Fig. 7; and

Fig. 9 is a schematic drawing of the circuit incorporating the pressure indicator of Fig. 1.

The pressure indicator of Fig. 1 has an outer body 10 with an externally threaded neck 11, and an external shoulder 12. A cylinder bore 13 is drilled into the body from the bottom.

Annular grooves 14, 15 are formed in the wall of the bore 13. The upper end of the body is tapped with internal threads 16, so as to leave a shoulder 17 between the groove and the thread.

A body insert 18 has an upper cylindrical section 19 with an outer diameter which makes a press fit in the bore 13, between the grooves 14 and 15. Its upper end abuts against the shoulder 17. This insert also has a lower cylindrical section 20 of smaller diameter than the upper section which leaves an annular spacing around the insert within the lower end of bore 13. It will be observed that this lower cylindrical section 20 is completely spaced from the outer body 10 around its entire periphery and it does not make contact with the outer body. An internal shoulder 21 forms a step between the two sections. Threads 23 are formed within the lower end of the lower cylindrical section 20.

The lower cylindrical section 20 is closed by an inner diaphragm 24 which may conveniently be made by drilling a bore 25 inside the lower cylindrical section 20, so as to leave a shoulder 26 between bore 25 and threads 23. An outer diaphragm 27 is spaced from, and attached to, the inner diaphragm by a central post 28. It will be appreciated that both diaphragms and the post can be made from the same piece of material merely by cutting the groove 28a between the two diaphragms. The diameter of the second diaphragm is larger than the diameter of the first diaphragm, and the edge of the second diaphragm is joined to the lower end of the externally threaded neck of the outer body by means such as brazing.

Water passages 29, 30 are drilled longitudinally into the body to intersect the upper annular groove 14, and nipples 31, 32 are screwed into the body to intersect passages 29, 30 and permit coolant hoses (not shown) to be attached thereto.

An electrode foot assembly 33 comprises a central conductive post 34, and a condenser plate 35 in the shape of a round, flat disc fitted within a metal case 36 having external threads 37. The metal case is filled with a ceramic filling 38, in which the post is embedded. Recesses 39 are provided in the upper end of the foot assembly to receive a tool for screwing the electrode foot assembly 33 into the threads 23 of the lower cylindrical section. The condenser plate can be accurately spaced from the inner diaphragm by screwing the foot assembly into the body insert to the proper depth. A mica spacer 40 is placed between the condenser plate 35 and the inner diaphragm 24 to prevent them from making direct contact with each other. The inner diaphragm 24 and condenser plate 35 make up a variable circuit element.

An electrode assembly 41 comprises a connector sleeve 42 with a neck 43 which has a central bore 44. The sleeve has external threads 45 near the middle of its larger end, and a shoulder 46 at an intermediate point of the sleeve. An insulating spacer 47 rests against shoulder 46, and a coil shield 48 bears against the spacer and fits within the sleeve. Another insulating spacer 49 bears against the shield, and the end of the sleeve is crimped as shown at 50 to hold the parts firmly together. This serves to enclose a coil assembly 51.

A conductive cup 52 is fastened to the second spacer 49 by a conductive rivet 53. The cup is crimped at its edges to hold the base of a conductive coil spring 54. When the connector sleeve is threaded into the body, the contact spring 54 is pressed against post 34, to make an electrical connection between the coil assembly 51 and the condenser plate 35.

A contact member 55 may conveniently comprise a ceramic sleeve 56 embedded in the neck 44, which surrounds and holds a headed post 57. This post is connected by a lead 58 to the coil assembly 51.

To direct the water flow through the pressure indicator, a first pair of blocks 59 are placed in the upper annular groove 14, and a second pair of blocks 60 in groove 15. The pair of blocks in each groove divides each groove into two segments. Ports (sometimes called passageways) 61, 62, 63, 64 are provided to allow flow between grooves 14 and 15.

Grooves 14 and 15 are formed in an internal surface of the outer body so that fluid carried within the groove is in direct fluid transfer relationship with the outer periphery of the inner body. It will be noted that these grooves substantially circumscribe the inner body. They completely circumscribe it except for the portions interrupted by the blocks which divide the flow.

Fig. 5 shows a means for connecting the inner and outer diaphragm, which is adapted for high pressure applications in which the outer diaphragm requires greater support than that provided in the embodiment of Fig. 1. In this case, the inner diaphragm 65 and outer diaphragm 66 are initially made of separate pieces of metal, and (see Fig. 6) concentric grooves 67 are formed in the end of the inner diaphragm, leaving concentric lands 68 with cross-grooves 69 therein. The outer diaphragm is then brazed to these lands and to the outer body 10 to make an integral structure.

The embodiment of Fig. 5 is shown without threads on the outer body, and instead is provided with a mounting flange 73. This permits the pressure indicator to be flange-mounted, instead of being screwed into a port. As will later be seen, this tends to reduce certain reading errors which may result when the pressure indicator is tightly screwed into a body. Any of the embodiments of this invention can be provided with a mounting flange or threads, whichever is desired.

Fig. 9 is a schematic illustration of a circuit incorporating this pressure indicator. A detailed disclosure of suitable external circuitry for use with this pressure indicator to provide a reading may be found in United States Patent 2,439,047 to Grinstead et al., issued April 6, 1948.

The operation of the pressure indicator will now be described with particular reference to the embodiment of Fig. 1. The assembled indicator will be mounted by screwing it into a thread-tapped port (not shown) in the wall of some chamber whose pressure is to be measured by the indicator, with the second diaphragm facing the pressure.

Hoses will be connected to the nipples 31 and 32, and coolant fluid, which may be water if desired, is forced from inlet 31 through the pickup and out of the outlet 32. From the inlet 31, the coolant enters passage 29, and from the passage 29 flows into upper groove 14. The flow divides into two paths in the semicircular groove formed by blocks 59, and passes downward through ports 61 and 62 to the left side of the lower groove 15 as formed by blocks 60. From this groove, coolant flows into the annular space between the insert and the outer body, and from that region into the right hand part of groove 15. While flowing through the annular space between the insert and the outer body, the coolant also flows between the inner and outer diaphragm, thereby cooling the outer diaphragm.

From groove 15 the coolant flows up through ports 63 and 64, and then converges in groove 14 to the outlet passage 30. From this passage 30, the coolant flows out nipple 32 to exhaust.

When pressure is exerted within the chamber, the outer diaphragm will be flexed inwardly with reference to the body. It will be appreciated that the outer annular segment of the outer diaphragm which lies between the central post 28 and the outer body will tend to "oil can" inwardly, and could shear at the edge of the post unless the diaphragm is made of adequate thickness. Therefore the thickness of the outer diaphragm is selected with due regard for the pressures for which this device is to be exposed. Pressure on the outer diaphragm forces the central post against the inner diaphragm 24, and moves the central portion toward the electrode foot assembly. It will be appreciated that the condenser plate 35 and the inner diaphragm 24 constitute the two plates of a condenser. They are completely insulated from each other by means of the mica spacer 40 and the ceramic filling 38. Pressures on outer diaphragm 27 creates a force which is transmitted to the inner diaphragm 24 by the post 28. Varying pressures cause carrying spacings between the condenser plate 35 and the inner diaphragm, thereby changing the capacitance of the condenser which they constitute.

The body insert 18 is held in columnar abutment with the outer body, and is also supported on its sides by said outer body. The entire body insert, including the electrode foot assembly 33 and the inner diaphragm 24 share all the movements of the outer body. If the outer body vibrates or otherwise moves, the body insert, electrode foot assembly and inner diaphragm move in unison and as a unit with the outer body. The electrical circuit element comprising the electrode foot assembly and inner diaphragm are thereby rendered insensitive to movements of the outer body, because such movements and forces do not cause any relative movement between them.

The only means for moving the inner diaphragm relative to the outer body is by flexure of the outer diaphragm. It will be appreciated that distortions and vibrations of the outer body could be transmitted through the outer diaphragm to move the inner diaphragm, and that these distortions and vibrations could cause a relative movement between the inner diaphragm and the condenser plate 35. Transmission of these forces to the inner diaphragm would introduce errors in readings. In fact, the error is often of the order of 200%-300% of the signal in conventional pickups in many installations.

Tht aforesaid error is often reduced to the order of 2%-3% in many of the same installations by using the pressure indicator of this invention. The transmission of these undesirable forces is reduced by making the outer diaphragm thin and weak compared to the inner diaphragm. The thinner and weaker diaphragm attenuates most of these forces, and the forces are not applied to the post 28.

Making the outer diaphragm thin does not, however, attenuate the forces exerted by the pressure being measured. The force on post 28 which moves the inner diaphragm is the product of the pressure against the outer diaphragm and the area of the outer diaphragm. Therefore, the outer diaphragm may be as thin as desired, and still will deflect the outer diaphragm so as to cause a pressure indication. The lower limits on thickness of the outer diaphragm are dictated by the need for the diaphragm to resist the shear forces at the margin of the post, and by the need to resist excessive "oil-canning." If the outer diaphragm distorts or "oil-cans" inwardly in an excessive amount, then the area of the outer diaphragm increases and this increases the force applied to post 28. This adds a force tending to change the measurement, which force is independent of the pressure being measured and therefore introduces a non-linear error in the measurement. Therefore, the diaphragm should not gain appreciably in area when pressure is applied thereto.

It is thus inherent that non-linear forces caused by the outer body will be diminished by making the outer diaphragm as thin as possible. It is equally inherent that the inner diaphragm should be made relatively thicker and stiffer than the outer diaphragm. This is because the inner diaphragm needs to respond only to direct forces exerted by the post 28, and its accuracy will be increased if it has a strong tendency to remain at, or return to, its null position.

The pressure indicator of Fig. 5 is installed by attaching the flange 73 to the wall of the pressure chamber or other supporting structure. When pressure is applied to the outer diaphragm 66, the annular segments between the lands 68 will tend to bulge inwardly. However, the provision of a plurality of these supporting lands reduces the radial span of each annular segment, so that the flexure of each segment is diminished below that which results when a "single span" such as shown in Fig. 1 is used. By decreasing the flexure of each "span," "oil-can" errors caused by an increase in area of the diaphragm are reduced, and a more linear response is thereby obtained.

The lands 68 transmit the force exerted by the chamber pressure to the inner diaphragm 65, which is thereby moved toward condenser plate 35.

For a given pressure, the embodiment of Fig. 5 permits the use of a thinner outer diaphragm than the embodiment of Fig. 1. This is because the shear forces exerted by the supporting lands 68, or the post 28, are proportional to the diaphragm area supported by the land or the post. When more lands are provided, diminished shear forces are exerted.

The same considerations relating to diaphragm thickness hold true for the condenser assembly shown in Figs. 7 and 8, where an even greater amount of support is provided for the outer diaphragm 71. The ports 72 leave comparatively heavy longitudinal columns between the two diaphragms. Of the three diaphragm assemblies, that of Fig. 7 is inherently the strongest, and an outer diaphragm of a given thickness may be used at higher pressures with this embodiment than in the other two illustrated embodiments.

In previously known pressure indicators, it has been customary for the entire body to be constructed as an integral piece and with only a single diaphragm. For example see the United States patent to Grinstead et al., Number 2,439,047, issued April 6, 1948, which shows a condenser type pressure indicator in which an electrode assembly is placed within a body, one side of which body is the single diaphragm. Some passages are drilled in the body for coolant fluid flow, but there is no total separation between the structure supporting the electrode assembly and the structure supporting the diaphragm. They comprise one continuous and integral piece of metal, and the electrode assembly is not isolated from the lower region of the body.

Although the pressure indicator shown in the above-identified Grinstead patent is satisfactory for many purposes, it has been found that an undesirable amount of non-linearity in readings is apt to be caused by conditions which have nothing to do with the pressure being measured. One cause of this type of non-linearity is what may be termed the "thread stretch" effect. When the pressure indicator is screwed into a thread tapped opening, a certain amount of distortion of the outer body is apt to result due to mechanical strains. This tends to change the spacing between the condenser plate and the diaphragm.

When the wall of the opening is heated, perhaps by explosions within a combustion chamber, and when the thermal coefficient of expansion of the wall is different from the thermal coefficient of expansion of the pressure indicator body, the non-linearity due to thread stretching is further increased. This is a frequently encountered situation, since the pressure indicator will be generally made of stainless steel, while the wall may be that of a motor cylinder made of ordinary steel.

It has been found that by supporting the electrode assembly in a body insert which is separate from the external body around its periphery, the flame of an oxy-acetylene torch can be applied to the threads (while cooling water is running through the pressure indicator) and no drift will occur on account of the applied heat, which indicates that no instrument error is introduced because of changed conditions. Conventional pressure pickups almost invariably show a drift in this test. This test indicates the extent of superiority of this construction over the prior art.

The pressure indicator of this invention provides an additional means for reducing errors due to temperature changes by the provision of a pair of diaphragms, the outer one of which is thinner than the inner diaphragh. It is inherent that the thinner the outer diaphragm, the more effective the coolant will be in keeping the said diaphragm at a normal temperature. A temperature rise in the outer diaphragm will cause an expansion which distorts the diaphragm and gives rise to an error in measurement. The cooling of a thick diaphragm is a difficult matter, and has rarely been well-accomplished, particularly when combustion chamber temperatures of the order of 800° to 1000° F. have to be coped with. By making the outer diaphragm thin, it has been found possible to keep the temperature thereof at a nearly constant value, thereby further reducing measurement errors.

A further advantage is to be found in the construction according to this invention. In the construction shown in the aforementioned Grinstead patent, the diaphragm was part of one continuous heavy body. Thus distortion due to forces on the outer body of the pickup were transmitted directly, and substantially undiminished, to the diaphragm, and this altered the electrical response of the condenser independently of any pressure change.

In the instant invention, the only connection between the lower end of the inner body insert and the outer body is through the relatively thin second diaphragm. The preferable relationship between the thickness of the first and second diaphragm is for the first diaphragm to be at least as thick as or somewhat thicker than the second, outer, diaphragm. In fact, a thickness ratio of approximately 2 to 1, has been found advantageous. With such an arrangement even hammer blows on the chamber wall are scarcely noticeable through the instrument. The higher this ratio between the diaphragm thicknesses, the better will be the performance of the pressure indicator. The higher ratio still further minimizes the distorting forces.

By providing a connection between the outer body and the body of the insert through a relatively weak outer diaphragm, the distortion effects which may take place in the outer body are considerably lessened in intensity, and are relegated to the status of a secondary effect which is generally much smaller in magnitude than the forces or conditions being measured.

This relatively thin connection between the outer body and the body insert is particularly advantageous in isolating the condenser elements from the effects of shock waves which may be transmitted through the wall of the chamber whose pressure is being measured. For example, shock waves in the mounting which may result from forces such as hammer blows, unbalanced rotary loads, or shock waves from explosions in other cylinders, are often a source of "interference" or "noise" which masks out the effects being measured. This relatively more flexible diaphragm serves to isolate the inner diaphragm from such effect.

It should be pointed out that the stiffness of a diaphragm varies with the cube of its thickness, so that even a moderate decrease in diaphragm in thickness materially increases the flexibility of the diaphragm, thereby improving the isolation of the inner diaphragm from the effects of shock waves, and other forces which might tend to mask out the forces to be measured. The construction according to this invention permits of a more flexible connection between the outer diaphragm and the variable circuit element.

It will also be observed that the outer diaphragm is provided with a larger area than the inner diaphragm. This also tends to make the outer diaphragm more flexible than the inner diaphragm, and further isolates the condenser assembly.

For use on an indicator according to Fig. 1 to be used for measuring pressures in neighborhood of 2000 pounds/square inch, a first diaphragm having a thickness of .040 inch, and an outer diaphragm of .015 inch thickness has been found satisfactory. For temperatures in the range of 70° F.–6000° F., a rate of coolant water flow, with the water at room temperature, of about 1 gallon per minute ordinarily proves adequate to protect the pressure indicator from heat damage.

For some applications, an even greater independence of outside disturbances can be attained by filling the coolant system with a dense liquid which further isolates the periphery of the circuit element from the body. As an example, liquid silicones may be utilized, which are denser than water, and sufficiently fluid to flow into the coolant system. These coolants, flowing through the channels, and particularly between the diaphragms, produce a dampening effect on the natural, or "ringing" frequency of the moveable diaphragm.

When installed in a system where the surrounding media offers sufficient cooling, and coolant flow through the device is not necessary, it will often be found advantageous to fill the coolant passages with some liquid, preferably a fluid denser than water, and then to plug the coolant system. The liquid then provides the aforementioned dampening effect, even without coolant flow. It will be appreciated that this liquid is disposed in the annular space within the bore 13 around the body insert 18, and between the inner and outer diaphragm.

There is thus provided by this invention an improved pressure indicator which is relatively free from the non-linear effects which may result from an integral connection of the measuring diaphragm with the outer body. It has been found that the pressure indicator described herein has an improved linearity for wider pressure ranges, and is more sensitive to rapid pressure changes, than presently-existing pressure indicators.

It is to be understood that this device is useful in other than capacitance type devices, and relates generally to electro-mechanical means, where, in response to a pressure variation, the electrical properties of a circuit element may be altered. The condenser means shown is perhaps the most frequently encountered application of this principle, but other useful variable conditions such as changes in resistance, for instance, are also known in the transducer art.

This invention is not to be limited to the embodiment shown in the drawing and described in the description which are given by way of example and not of limitation, but only in accordance with the scope of the appended claims.

I claim:

1. A pressure indicator comprising: an outer body adapted to be mounted to a chamber in which pressure is to be measured, said outer body including an internal wall which defines an inner bore adjacent the end of the outer body which is adapted to be exposed to chamber pressure; an outer flexible diaphragm attached to said outer body and extending across and closing said inner bore, the outer flexible diaphragm isolating the inner bore from said chamber pressure; an inner body mounted to said outer body and projecting into said inner bore, that part of the inner body which projects into said inner bore having smaller corresponding lateral dimensions than the wall of said inner bore so as to leave a continuous spacing therebetween; an inner flexible diaphragm mounted only to and closing the end of said part of the inner body, said inner flexible diaphragm being spaced from said outer flexible diaphragm so as to leave a space therebetween; a post interconnecting the flexible diaphragms, the post being the only direct interconnection between the diaphragms; a variable circuit element comprising the inner flexible diaphragm and a plate which is stationarily mounted in and insulated from the inner body, said plate facing and being spaced from the inner flexible diaphragm; whereby flexure of the outer flexible diaphragm exerts a force through the post on the inner diaphragm, thereby deflecting the inner diaphragm and varying the spacing between the inner diaphragm and the plate to vary the response of the variable circuit element, an annular groove in one of the bodies, the groove substantially circumscribing said inner body, a pair of substantially diametrically opposed blocks in said groove, which blocks divide the groove into two segments, a first port in one of said bodies in communication with one segment of said groove, and a second port through one of said bodies in communication with the other segment of said groove, said segments each communicating with the spacing between the wall of the inner bore and the inner body and communicating with each other only through the said spacing, whereby coolant fluid can be introduced through said first port and thence into one segment of the groove from which it flows into the said spacing and thence through the other segment of the groove and out the second port.

2. Apparatus according to claim 1 in which the said annular groove is formed in an interior surface of the outer body, and opens onto the inner body, and in which the ports are formed in the outer body.

3. A pressure indicator comprising: an outer body adapted to be mounted to a chamber in which pressure is to be measured, said outer body including an internal wall which defines an inner bore adjacent the end of the outer body which is adapted to be exposed to chamber pressure; an outer flexible diaphragm attached to said outer body and extending across and closing said inner bore, the outer flexible diaphragm isolating the inner bore from said chamber pressure; an inner body mounted to said outer body and projecting into said inner bore, that part of the inner body which projects into said inner bore having smaller corresponding lateral dimensions than the wall of said inner bore so as to leave a continuous spacing therebetween; an inner flexible diaphragm mounted only to and closing the end of said part of the inner body, said inner flexible diaphragm being spaced from said outer flexible diaphragm so as to leave a space therebetween; a post interconnecting the flexible diaphragms, the post being the only direct interconnection between the diaphragms; a variable circuit element comprising the inner flexible diaphragm and a plate which is stationarily mounted in and insulated from the inner body, said plate facing and being spaced from the inner flexible diaphragm; whereby flexure of the outer flexible diaphragm exerts a force through the post on the inner diaphragm, thereby deflecting the inner diaphragm and varying the spacing between the inner diaphragm and the plate to vary the response of the variable circuit element, a pair of annular grooves in one of said bodies, which grooves are spaced from each other and which substantially circumscribe said inner body, a pair of substantially diametrically opposed blocks disposed in each of said grooves, which blocks divide each groove into two segments, a first port in one of said bodies in communication with a first segment of a first of said grooves and a second port through one of said bodies in communication with the second segment of said first groove, a first passageway between the first segment of said first groove and a first segment of said second groove, and a second passageway between said second segment of said first groove and said second segment of said second groove, both segments of said second groove being in fluid communication with the spacing between said wall and the inner body and communicating with each other only through said spacing, whereby coolant fluid can be introduced into said first port from which it flows through the first segment of the first groove through said first passageway to the first segment of said second groove, through said spacing to the second segment of said second groove, through said second passageway to the said second segment of first groove and out the second port.

4. Apparatus according to claim 3 in which said annular grooves are formed in an interior surface of the outer body and open onto the inner body, and in which the ports are formed in the outer body.

5. Apparatus according to claim 4 in which a pair of first passageways interconnect the first segments of the first and second grooves and which a pair of second passageways interconnect the second segment of the first and second grooves, and in which the ports enter the grooves between the passageways.

6. A pressure indicator comprising an outer body having an externally threaded neck and an internal wall defining an inner bore in said neck; and outer flexible diaphragm closing one end of said inner bore, said outer flexible diaphragm being adapted to be exposed to pressure to be measured; an inner body attached in columnar relationship to the outer body and projecting into the inner bore, that part of the inner body which projects into said inner bore having smaller corresponding lateral dimensions than the wall of said inner bore whereby the inner body is completely laterally spaced from the wall of the outer bore so as to leave a continuous spacing therebetween, said inner body having a threaded opening therein; an inner flexible diaphragm mounted only to and closing the end of said port of the inner body, said inner flexible diaphragm being spaced from said outer flexible diaphragm so as to leave a space therebetween; a central post interconnecting the diaphragms, the post being the only direct interconnection between the diaphragms; an electrode foot assembly threadedly mounted in the threaded opening in the inner body, which assembly includes an insulating member, a conductive post passing through said insulating member, and a condenser plate attached to said post, which plate faces and is spaced from said inner diaphragm, whereby the plate and the inner diaphragm comprise a variable-capacity condenser in which variations in pressure on the outer diaphragm transmitted as forces through the post to the inner flexible diaphragm deflect the inner diaphragm so as to vary its spacing from the plate, thereby changing the capacity of the condenser as a function of pressure on the outer diaphragm, an annular groove in one of the bodies, the groove substantially circumscribing said inner body, a pair of substantially diametrically opposed blocks in said groove, which blocks divide the groove into two segments, a first port in one of said bodies in communication with one segment of said groove, and a second port through one of said bodies in communication with the other segment of said groove, said segments each communicating with the spacing between the wall of the inner bore and the inner body and communicating with each other only through the said spacing, whereby coolant fluid can be introduced through said first port and thence into one segment of the groove from which it flows into the said spacing and thence through the other segment of the groove and out the second port.

7. Apparatus according to claim 6 in which the said annular groove is formed in an interior surface of the outer body and opens onto the inner body, and in which the ports are formed in the outer body.

8. A pressure indicator comprising an outer body having an externally threaded neck and an internal wall defining an inner bore in said neck; an outer flexible diaphragm closing one end of said inner bore, said outer flexible diaphragm being adapted to be exposed to pressure to be measured; an inner body attached in columnar relationship to the outer body and projecting into the inner bore, that part of the inner body which projects into said inner bore having smaller corresponding lateral dimensions than the wall of said inner bore whereby the inner body is completely laterally spaced from the wall of the outer bore so as to leave a continuous spacing therebetween, said inner body having a threaded opening therein; an inner flexible diaphragm mounted only to and closing the end of said port of the inner body, said inner flexible diaphragm being spaced from said outer flexible diaphragm so as to leave a space therebetween; a central post interconnecting the diaphragms, the post being the only direct interconnection between the diaphragms; an electrode foot assembly threadedly mounted in said opening, which assembly includes an insulating member, a conductive post passing through said insulating member, and a condenser plate attached to said post, which plate faces and is spaced from said inner diaphragm, whereby the plate and the inner diaphragm comprise a variable condenser in which variations in pressure on the outer diaphragm transmitted as forces through the post to the inner flexible diaphragm deflect the inner diaphragm so as to vary its spacing from the plate, thereby changing the capacity of the condenser as a function of pressure on the outer diaphragm, a pair of annular grooves in one of said bodies, which grooves are spaced from each other and which substantially circumscribe said inner body, a pair of substantially diametrically opposed blocks disposed in each of said grooves, which blocks divide each groove into two segments, a first port in one of said bodies in communication with a first segment of a first of said grooves and a second port through one of said bodies in communication with the second segment of said first groove, a first passageway between the first segment of said first groove and a first segment of said second groove, a second passageway between said second segment of said first groove and said second segment of said second groove, both segments of said second groove being in fluid communication with the spacing between said wall and the inner body and communicating with each other only through said spacing, whereby coolant fluid can be introduced into said first port from which it flows through the first segment of the first groove through said passageway to the first segment of said second groove, through said spacing to the second segment of said second groove, through said second passageway to the said second segment of first groove and out the second port.

9. Apparatus according to claim 8 in which said annular grooves are formed in an interior surface of the outer body and open onto the inner body, and in which the ports are formed in the outer body.

10. Apparatus according to claim 9 in which a pair of first passageways interconnect the first segments of the first and second grooves and which a pair of second passageways interconnect the second segment of the first and second grooves, and in which the ports enter the grooves between the passageways.

References Cited in the file of this patent
UNITED STATES PATENTS

| | | |
|---|---|---|
| 2,266,315 | Frawley | Dec. 16, 1941 |
| 2,345,071 | Reynst | Mar. 28, 1944 |
| 2,367,866 | Humphreys | Jan. 23, 1945 |
| 2,439,047 | Grinstead | Apr. 6, 1948 |